May 10, 1938.  J. T. SMITH  2,117,119
REFRIGERATING SYSTEM FOR ICE CREAM FREEZERS
Filed Jan. 11, 1935
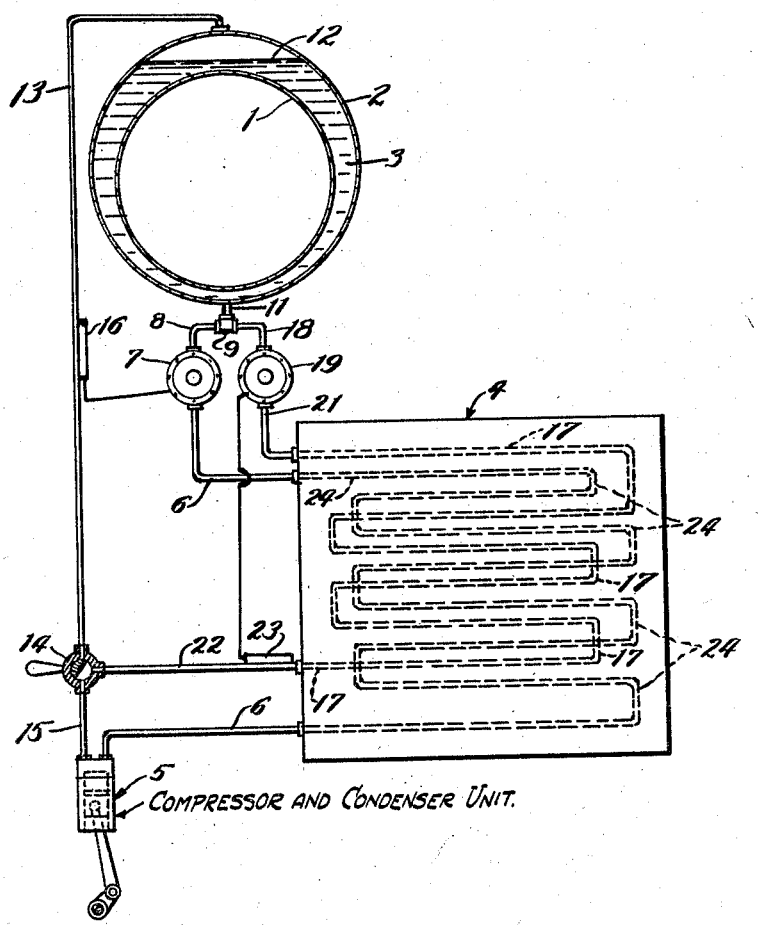
Inventor.
James T. Smith
By: Carl S. Lloyd
Atty.

Patented May 10, 1938

2,117,119

UNITED STATES PATENT OFFICE 2,117,119

REFRIGERATING SYSTEM FOR ICE CREAM FREEZERS

James T. Smith, Chicago, Ill., assignor to Mills Novelty Company, Chicago, Ill., a corporation of Illinois Application January 11, 1935, Serial No. 1,295

10 Claims. (Cl. 62—114)

This invention relates to improvements in a refrigerating system which is particularly designed for use with an ice cream freezer of the type wherein cooling of the cream is effected by direct expansion of a refrigerant in the cooling compartment of the freezer.

The object of the invention is to provide in a refrigerating system of the type specified means for pre-cooling the supply of liquid refrigerant passing to the freezer, thus reducing the time required for the freezing operation, and giving both increased efficiency in operation and improved quality of the frozen product.

The invention will be fully understood from the following detailed description, taken in connection with the accompanying drawing wherein I have shown a refrigerating system provided with the improved pre-cooling apparatus.

In my United States Letters Patent Nos. 1,968,507 and 1,968,508 I have shown and described a refrigerating system for a freezer of the direct expansion type wherein there is included an ice cream hardening cabinet which is used in conjunction with the freezer, and which is operated from the same compressor-condenser unit which operates the freezer. In the system shown in the aforesaid patents the liquid refrigerant is conducted directly from the condenser to the cooling compartment of the freezer. I have found that by providing in such a system means for effecting pre-cooling of the supply of liquid refrigerant passing to the freezer, in a manner hereinafter to be explained, it is possible to cut down the freezing time by as much as 20%. In the freezing of ice cream it is desirable to freeze the cream in a very short space of time inasmuch as a prolonged freezing operation not only makes for inefficiency in operation, but also results in a greatly inferior product.

Referring to the drawing, wherein the various units in the system are shown in diagrammatic form, the numeral 1 designates the cream chamber of an ice cream freezer, and numeral 2 designates an outer jacket which is spaced from chamber 1 to provide a cooling compartment 3 for receiving a supply of liquid refrigerant. When the cream mix is drawn from the freezer it is in a semi-fluid condition, and a hardening cabinet 4 is therefore provided for reducing the mix from the semi-frozen condition to fully hardened condition, which is attained at a temperature of between zero and 5° F. It may be stated that freezer equipment of this type is commonly used in retailing establishments, the freezer ordinarily having such capacity that it is only necessary to operate it at intervals. After a batch of cream has been frozen it is hardened and stored in cabinet 4 until such time as it is needed for consumption.

The refrigerant is circulated through the system by a compressor-condenser unit indicated generally by numeral 5, the showing of this unit being diagrammatic only inasmuch as the construction of such apparatus is well understood in the art. Liquid refrigerant is supplied from the condenser to the freezer through a conduit 6, which connects through a thermostatic expansion valve 7 with a conduit 8, the latter in turn connecting through a T-connection 9 with a short pipe 11 which opens into the lower portion of cooling compartment 3. The freezer is operated on the flooded system, valve 7 being arranged to maintain the body of liquid 12 at a proper level in the cooling compartment 3. As the liquid passes through pipe 11 into compartment 3 it starts to evaporate under the heating action of the warm mix in cream chamber 1, the vaporized refrigerant being withdrawn from the upper portion of chamber 3 through a take-off pipe 13 which connects through a two-way valve 14 with a pipe 15, the latter returning the vapor to the suction side of the compressor. A power element 16, associated with expansion valve 7, is positioned adjacent vapor return line 13, thereby automatically adjusting valve 7 in accordance with the temperature of line 13 to maintain a proper liquid level in the cooling compartment 3.

Hardening cabinet 4 is provided with a cooling element 17 to which refrigerant is supplied from a pipe 18 which is connected to the liquid supply line for the freezer through T-connection 9. Liquid refrigerant passing through pipe 18 is conducted through a thermostatic expansion valve 19 which in turn connects through a pipe 21 with cooling element 17. After passing through expansion element 19 the liquid is changed to vapor in coil 17 which, after passing through the coils of element 17, is returned to the suction side of the compressor through a vapor return line 22, valve 14, and pipe 15. A power element 23, associated with expansion element 19, is positioned adjacent vapor return line 22, and thus serves to regulate the pressure in element 17 in accordance with the temperature of return line 22. It may be added that the compressor-condenser unit 5 is provided with a pressure control device (not shown) which automatically cuts out the unit when the pressure falls to a certain point, and cuts it in when the pressure rises to a predetermined point.

It will be observed that with valve 14 positioned as shown in the drawing, vapor return line 13 for the freezer is closed, and vapor return line 22 for cooling element 17 is open. This represents the condition of the system when the freezer is removed from the circuit. Liquid refrigerant remaining in chamber 3 after closing of line 13 is drained back through pipe 11 to pipe 18 from whence it passes through cooling element 17 and line 22 to the compressor. Under these conditions cooling element 17 receives the full supply of liquid refrigerant from line 6. When it is desired to freeze a batch of cream, valve 14 is thrown to a position closing line 22 and opening line 13, thereby establishing a vapor return for the freezer through line 13, and pipe 15 to the suction side of the compressor. With the freezer thus in operation vapor return line 22 for cooling element 17 is closed and the full capacity of the compressor-condenser unit 5 is on the freezer. The freezer and the hardening cabinet are thus designed for alternate use, with the hardening cabinet 4 isolated from the system while the freezer is in operation, the freezer being similarly isolated from the circuit at all times except during the actual freezing operation.

As previously stated it has been the practice up to the present time to carry the supply of liquid refrigerant through pipe 6 directly from the condenser to the cooling chamber 3. In accordance with my invention a portion of this liquid supply line 6 is brought into heat exchanging relation with cooling element 17 of hardening cabinet 4, the purpose of this arrangement being to effect pre-cooling of the body of liquid refrigerant before it enters cooling chamber 3. In the embodiment of the invention shown in the drawing this is accomplished by including in series with supply line 6 a coil 24, the individual coils or sections of which are arranged in heat exchanging relation with the coils of element 17. In the freezing of ice cream, expansion element 19 is usually adjusted so as to maintain a temperature of from zero to minus 15° F. in cabinet 4. By thus passing the supply of liquid refrigerant through cabinet 4, in heat exchanging relation with element 17, I am able to effect a marked pre-cooling of the liquid before it reaches chamber 3 of the freezer. With this arrangement I find that the freezing of a batch of cream may be accomplished in a much shorter space of time, my experiments having shown that the time period may be easily reduced by as much as 20% over the time required for freezing with the systems now employed. The exchange of heat which takes place between coils 24 and 17 results in the body of liquid entering cooling chamber 3 at a correspondingly reduced temperature, and this expedites the freezing operation, the liquid being more effective as a cooling medium by reason of its lowered temperature. Since the freezer in most instances is operated but a small fraction of the time, the absorption of this extra amount of heat in the hardening cabinet 4 in no way places an undue burden on the system. The condenser included in the compressor-condenser unit 5 may be of conventional form, and includes a receiver for holding a supply of liquid refrigerant which supplements the supply which is held in line 6 and coil 24.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. In an ice cream freezing system the combination of a freezer, including a compartment for receiving a refrigerating medium, a compressor, a condenser associated with said compressor, a second refrigerating unit, a cooling element for the latter, and connections for supplying liquid refrigerant to the freezer and said second refrigerating unit and for returning vaporized refrigerant from said freezer and unit to the compressor, said connections including valve means for shutting off the liquid supply to either said freezer or said unit and directing such supply to the other thereof, thereby rendering the full capacity of the compressor and condenser available for either said freezer or said second refrigerating unit, said liquid supply connection for the freezer being arranged in heat exchanging relation with said cooling element for the second refrigerating unit, whereby to effect pre-cooling of the body of liquid refrigerant passing from the condenser to the freezer.

2. In an ice cream freezing system the combination of a freezer, including a compartment for receiving a refrigerating medium, a second refrigerating unit, a cooling element for the latter, a compressor, a condenser associated with said compressor, connections for supplying liquid refrigerant from the condenser to the freezer and to said second refrigerating unit, vapor return lines for conducting vaporized refrigerant from said freezer and said unit to the compressor, and valve means for shutting off the liquid supply to either the freezer or the second refrigerating unit and directing such supply to the other thereof, thereby rendering the full capacity of the compressor and condenser available for either said freezer or said second refrigerating unit, said liquid supply connection for the freezer including a coil arranged in heat exchanging relation with said cooling element for the second refrigerating unit, whereby to effect pre-cooling of the body of liquid refrigerant passing from the condenser to the freezer.

3. In an ice cream freezing system the combination of a freezer, including a compartment for receiving a refrigerating medium, a compressor, a condenser associated with said compressor, a second refrigerating unit, a cooling element for the latter, a liquid supply line for conducting liquid refrigerant from the condenser to the freezer, a second liquid supply line inter-connected with said supply line for the freezer for conducting refrigerant to said cooling element for said second refrigerating unit, a vapor return line for conducting vaporized refrigerant from the freezer to the compressor, a second vapor return line for conducting vaporized refrigerant from said second refrigerating unit to the vapor return for the freezer, and valve means for simultaneously opening one of said returns and closing the other, the liquid supply connection for the freezer being arranged in heat exchanging relation with said cooling element for the second refrigerating unit, whereby to effect pre-cooling of the body of liquid refrigerant passing from the condenser to the freezer.

4. In an ice cream freezing system the combination with a freezer, a hardening cabinet, connections for conducting a supply of liquid refrigerant from a common compressor-condenser unit to the freezer and hardening cabinet and for returning vaporized refrigerant to said unit, and valve means for shutting off the liquid supply to either the freezer or the hardening cabinet and directing such supply to the other thereof, thereby rendering the full capacity of the compressor-condenser unit available for either the freezer or the hardening cabinet, of means for directing the supply of liquid refrigerant for the freezer through the hardening cabinet, whereby to effect precooling of said supply before passage thereof to the freezer.

5. In a refrigerating system for ice cream freezers a compressor-condenser unit for supplying liquid refrigerant, a freezer provided with a refrigerating space, a cooling cabinet having a cooling coil therein comprising a freezer suction line return to the compressor-condenser, and a refrigerant liquid inlet from the compressor-condenser unit to the freezer, said inlet being in heat exchanging relation with the freezer suction line return in the cabinet and subject to the cooling effect of the interior of the cabinet, whereby to effect precooling of the liquid refrigerant in said inlet.

6. In a refrigerating system for ice cream freezers, a compressor-condenser unit for supplying liquid refrigerant, a freezer provided with a refrigerating space, a cooling cabinet, an evaporator coil therein comprising a suction return line from the freezer to the compressor-condenser unit, a refrigerant liquid inlet line from the compressor-condenser unit to the freezer, said inlet line having a portion located inside the cabinet and subject to the cooling effect of the interior of the cabinet, whereby to effect precooling of the liquid refrigerant in said inlet, and an expansion valve in said inlet line between the freezer and the cooling cabinet.

7. In a refrigerating system for ice cream freezers, a compressor-condenser unit for supplying liquid refrigerant, a freezer provided with a refrigerating space, a cooling cabinet having a cooling coil therein comprising a freezer suction line return to the compressor-condenser, and a refrigerant liquid inlet from the compressor-condenser unit to the freezer, said inlet including an extended portion located in the cabinet and subject to the cooling effect of the interior of the cabinet, whereby to effect precooling of the refrigerant passing through said inlet.

8. In a refrigerating system for ice cream freezers, a compressor-condenser unit for supplying liquid refrigerant, a freezer provided with an evaporator having an inlet and an outlet, a cooling cabinet, a second evaporator, disposed in said cooling cabinet, a refrigerant inlet line extending from said compressor, thence through said cooling cabinet and thence to said freezer evaporator inlet, an expansion valve located in said inlet line, a connection between said freezer evaporator inlet and said second evaporator, a second expansion valve in said last-named connection, a return line connected to the freezer evaporator outlet, for returning volatilized refrigerant to the compressor, a second return line for conducting volatilized refrigerant from the second evaporator to the compressor, and valve means for simultaneously opening one of said returns and closing the other.

9. In a refrigerating system for ice cream freezers, a compressor-condenser unit for supplying liquid refrigerant, a freezer provided with an evaporator having an inlet and an outlet; a cooling cabinet; a second evaporator, disposed in said cabinet; a freezer refrigerant circuit including the freezer evaporator, an inlet line extending from the compressor, thence through said cooling cabinet to effect precooling of its contained liquid refrigerant, and thence to said freezer evaporator inlet, an expansion valve located in said inlet line, and a return line for returning volatilized refrigerant from said freezer outlet to said compressor; a refrigerant circuit for the cooling cabinet, comprising said second evaporator, a connection between said inlet line and said second evaporator, a second expansion valve, located in said connection, and a second return line for returning volatilized refrigerant from said second evaporator to the compressor; and valve means for simultaneously opening one of said circuits to direct the full flow of refrigerant therethrough, and closing the other.

10. In an ice cream freezing system, in combination with a freezer, a second refrigerating unit, a compressor-condenser unit, connections for conducting a supply of liquid refrigerant from the compressor-condenser unit to the freezer and to the second refrigerating unit and for returning vaporized refrigerant to said compressor-condenser unit, and valve means for shutting off the liquid supply from either the freezer or the second refrigerating unit and for directing such supply to the other thereof, thereby rendering the full capacity of the compressor-condenser unit available for either the freezer or the second refrigerating unit; a means for directing a supply of liquid refrigerant for the freezer through the second refrigerating unit, whereby to effect precooling of such supply while in liquid form before passage thereof to the freezer.

JAMES T. SMITH.